United States Patent [19]
Kindstrand et al.

[11] Patent Number: 5,493,755
[45] Date of Patent: Feb. 27, 1996

[54] SHOCK AND VIBRATION ISOLATING CASTER SUSPENSION

[75] Inventors: Daniel H. Kindstrand, Newton; David F. Cerqua, Maynard; Paul R. Gagnon, Acton, all of Mass.

[73] Assignee: Applied Power Inc., Butler, Wis.

[21] Appl. No.: 301,098

[22] Filed: Sep. 6, 1994

[51] Int. Cl.⁶ .................................................. B60B 33/00
[52] U.S. Cl. ................................................... 16/46; 16/44
[58] Field of Search ........................... 16/46, 47, 29, 16/31 R, 31 A, 44

[56] References Cited

U.S. PATENT DOCUMENTS

| | | |
|---|---|---|
| 1,745,992 | 2/1930 | Herold . |
| 2,066,187 | 12/1936 | Piron . |
| 2,272,270 | 2/1942 | Krotz . |
| 2,285,656 | 6/1942 | Herold . |
| 2,543,948 | 3/1951 | Wiedman . |
| 2,581,912 | 1/1952 | Brown . |
| 2,700,173 | 1/1955 | Huffman ........................ 16/44 |
| 3,041,656 | 7/1962 | Goodall . |
| 3,178,758 | 4/1965 | Patterson ...................... 16/44 |
| 4,188,048 | 2/1980 | Haung et al. . |
| 4,312,096 | 1/1982 | Schubert et al. . |
| 4,649,595 | 5/1987 | Shane . |
| 4,707,881 | 11/1987 | Van Hoye ....................... 16/44 |
| 5,305,496 | 4/1994 | Gagnon et al. . |
| 5,394,589 | 3/1995 | Braeger et al. ................. 16/44 |

FOREIGN PATENT DOCUMENTS

| | | |
|---|---|---|
| 0104714 | 4/1984 | European Pat. Off. . |
| 793615 | 1/1936 | France . |
| 491364 | 8/1938 | United Kingdom . |
| 582371 | 11/1946 | United Kingdom . |
| 629434 | 9/1949 | United Kingdom . |

Primary Examiner—P. Austin Bradley
Assistant Examiner—Chuck Y. Mah
Attorney, Agent, or Firm—Quarles & Brady

[57] ABSTRACT

A caster has a stationary hub with a bearing between the hub and a floor engaging wheel ring which allows the wheel ring to rotate relative to the hub. Torsional elastomeric elements mount the hub between spaced support arms radially inward of the bearing and are positioned eccentrically relative to the axis of rotation of the wheel ring so as to suspend the hub resiliently between the arms. In an alternate embodiment, the hub is cantilevered from a single support arm.

10 Claims, 3 Drawing Sheets

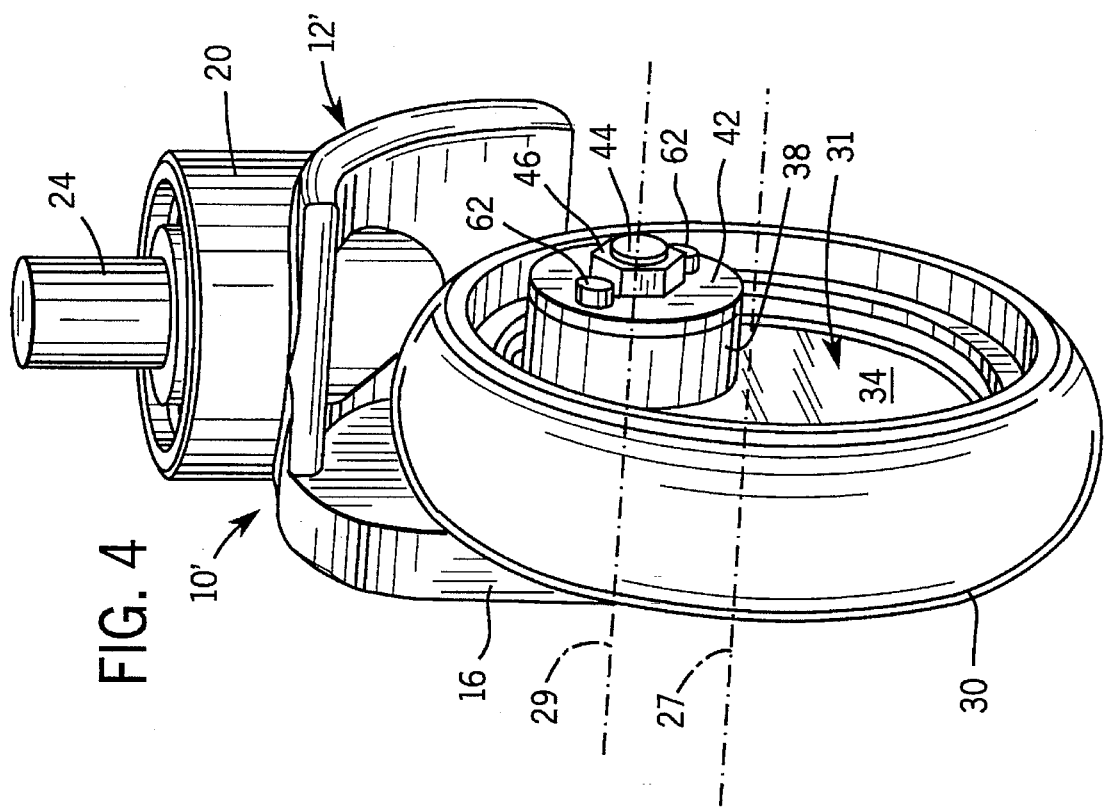
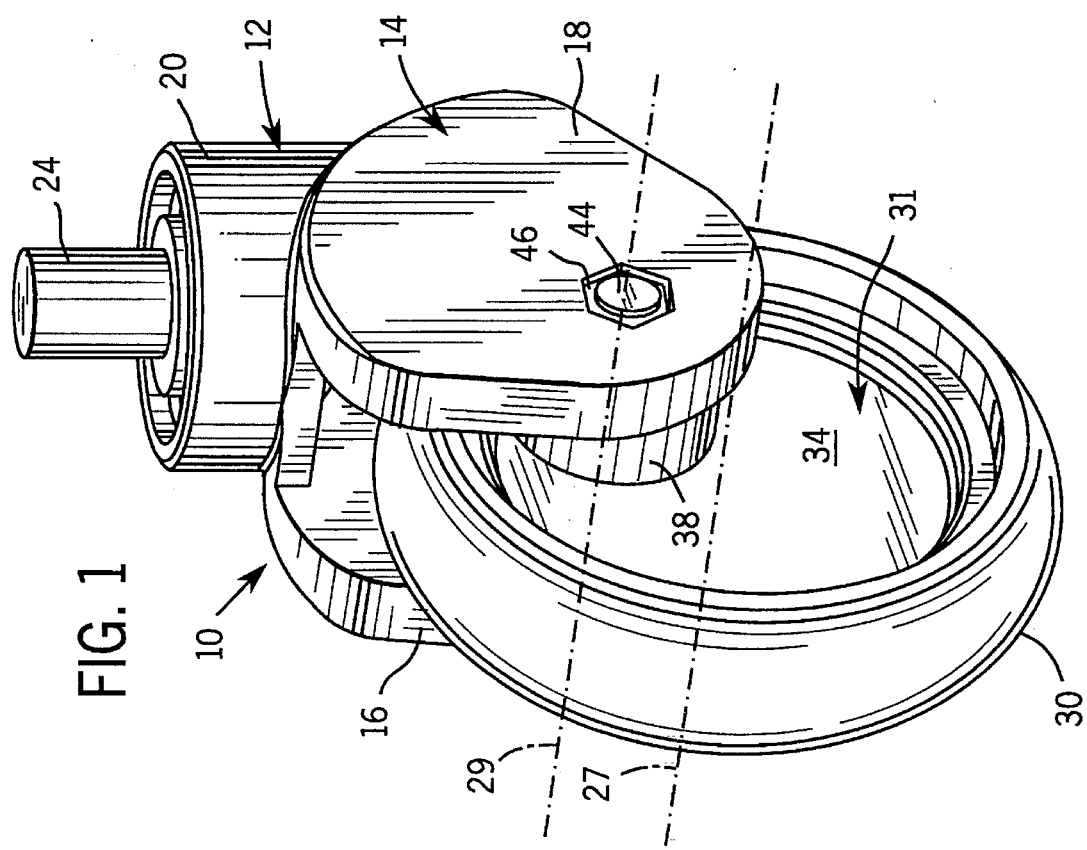

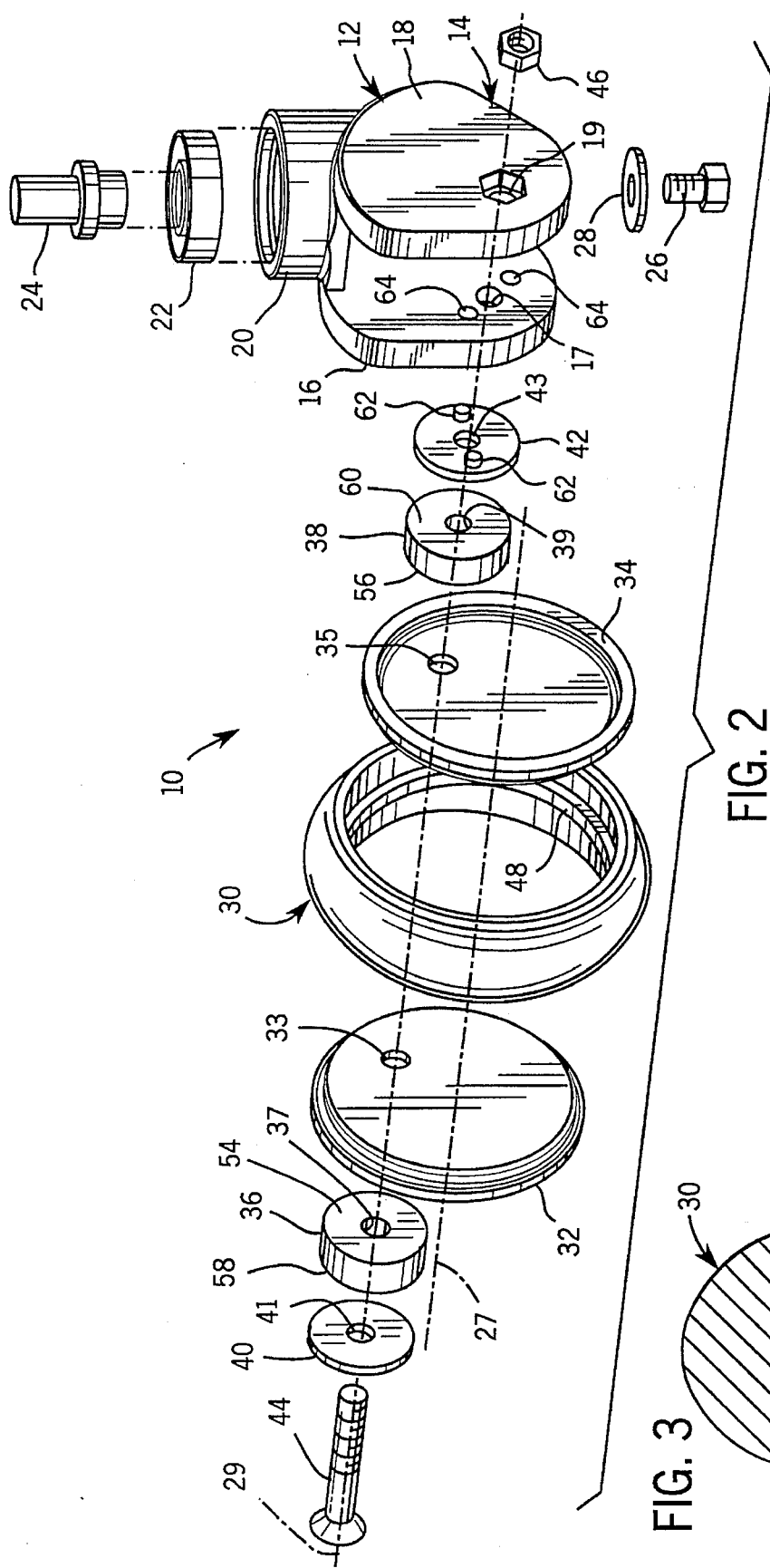

SHOCK AND VIBRATION ISOLATING CASTER SUSPENSION

FIELD OF THE INVENTION

This invention relates to casters, and in particular to casters having elastomeric shock and vibration isolation elements.

DISCUSSION OF THE PRIOR ART

Casters having elastomeric torsion elements for absorbing shocks and vibrations are known, for example, from U.S. Pat. No. 4,312,096. In these casters, a yoke shaped bearing support is secured to the structure to be mounted on casters, a pair of wheel supports rotatably mounts a wheel between them, and an elastomeric torsion element is bonded between the bearing support and wheel supports. The wheel supports are rotatable relative to the bearing support, about an axis which is longitudinally offset from the wheel axle so that vertical loads applied to the wheel subject the elastomeric element to torsional shear stresses.

With these types of casters, for any given wheel diameter, the height of the caster itself has in some cases been excessive. The overall height of the caster has been reduced by increasing the angle between the bearing axis and the wheel axis (as measured from a vertical line through and below the bearing axis), but this results in a relatively long caster and high preloading forces being applied to the elastomeric torsion element, since for a large angle a significant proportion of the static weight load must be born by the torsional resistance of the elastomeric element. In addition, when subjecting the elastomeric element to high and continuous torsional loads, it is possible that the bonds between the element and the wheel support and bearing support may fail or that the element itself may shear and therefore cause the caster to collapse.

A two-wheel caster which overcomes these shortcomings is disclosed in U.S. Pat. No. 5,305,496. However, a need exists for a caster which may be made with a single wheel which overcomes these shortcomings.

SUMMARY OF THE INVENTION

This invention provides such a caster. A shock and vibration isolating caster of the invention has a circular wheel ring adapted for rolling engagement with a ground or floor surface at its outer periphery. A hub radially inside of said wheel ring is secured to said wheel ring so as to restrain the wheel ring axially and radially relative to the hub. A bearing is provided between the wheel ring and the hub so that the wheel ring can rotate relative to the hub about an axis of rotation which is coaxial with the hub, wheel ring and bearing. A suspension for the hub includes a body having a mount for mounting the caster to a structure to be supported at least in part by the caster and a support mounting the hub so as to allow limited angular motion of the hub relative to the support about a support axis which is offset from the axis of rotation of the wheel ring relative to the hub. An elastomeric element is positioned radially inward of the bearing and the element has two axially facing, opposed faces, one of the faces being secured against lateral motion relative to the hub and the other of the faces being secured against lateral motion relative to the support, so that the hub can move angularly back and forth relative to the support about the support axis against resistance of the element. This construction eliminates the legs which the prior art had extending between the support yoke and the wheel, to thereby reduce the overall size of the caster and simplify the construction of the caster.

Preferably, the element is coaxial with the support axis so that it is loaded in torsional shear to resist rotation of the hub relative to the support. For ease of assembly, it is preferred that a torsion plate be secured to the other face of the torsion element and the torsion plate secured against lateral motion relative to the support, for example with pegs that engage in corresponding holes in the support.

For additional strength, two of the torsion elements may be provided, one on each side of the hub, and a support provided outboard of each element, with torsion plates between the elements and the corresponding supports. A fastener may also be provided extending from one support to the other, preferably coaxial with the support axis. Alternatively, the hub may be cantilevered from a single support.

Additional features and advantages of the invention will be apparent from the drawings and the detailed description of the preferred embodiments.

BRIEF DESCRIPTION OF THE DRAWINGS

FIG. 1 is a perspective view of a caster of the invention;

FIG. 2 is an exploded perspective view of the caster of FIG. 1;

FIG. 3 is a fragmentary sectional view of the caster of FIG. 1;

FIG. 4 is a perspective view of a second embodiment of a caster of the invention.

DETAILED DESCRIPTION OF THE PREFERRED EMBODIMENTS

Figure 5:
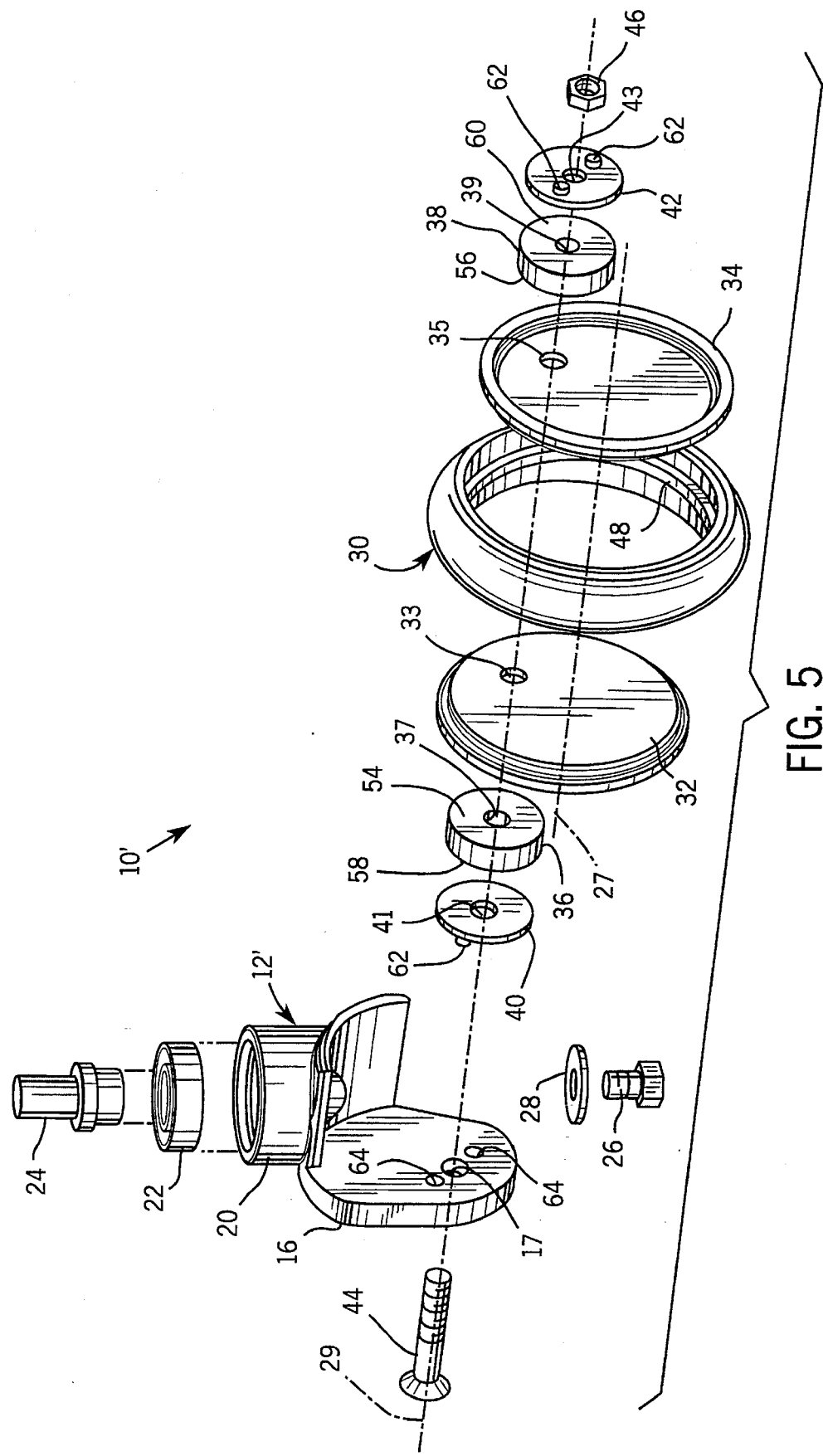
FIG. 5 is an exploded perspective view of the caster of FIG. 4.

Referring to FIGS. 1 and 2, a caster 10 of the invention has a body 12 which may, for example, be made out of a plastic material such as nylon. The body 12 has a yoke 14 defined by two support arms 16 and 18 which are integral with a swivel mount 20. The swivel mount 20 is generally tubular having a normally vertical axis, and houses a swivel bearing 22 which may be, for example, a ball bearing or other type of anti-friction bearing.

The swivel bearing 22 is retained in the swivel mount 20 by a mounting stem 24 which is secured to the swivel mount from its lower end by a fastener 26 which extends through washer bearing 28 and into the mounting stem 24. The mounting stem 24 is secured to the cart, chair or other fixture which is intended to be supported by the caster 10. It should be understood that any form of attachment may be used for securing the body 12 to the structure to be supported by the caster, including stationary mounts or other types of swivel mounts, all of which are well known in the art, and that the support arms may be secured to the mount by being integral therewith, or by any other connection which is intended to hold the mount and arms together in normal operation of the caster.

A wheel ring 30 is supported between the arms 16 and 18 by a hub 31 which includes hub halves 32 and 34, elastomeric torsion elements 36 and 38 and torsion plates 40 and 42. A fastener 44 extends through, in order, the arm 16, torsion plate 40, element 36, hub 32, hub 34, element 38, torsion plate 42, and arm 18, and is secured therein by nut 46.

The wheel ring 30 has an outer periphery which is adapted for rolling engagement with a ground or floor surface. The inner periphery of the wheel ring 30 defines the outer raceway of mating journal bearing surfaces which allow the wheel ring 30 to rotate relative to the hub 31. The inner raceway of this bearing is defined on the outer periphery of this hub. As shown in FIG. 3, when the hub halves are put together, they mate with shoulder ring 48 on the interior of the wheel ring 30 to form a journal bearing between the hub 31 and the wheel ring 30.

Hereinafter, the assembly of the hub 31 and the wheel ring 30 is referred to as a stationary hub caster. Such stationary hub casters are known in the art. The wheel ring 30 may be made from a relatively hard and lubricious plastic material, such as nylon, or may be made from a metal such as steel. Alternatively, the wheel ring 30 could be made in two pieces, having an elastomeric tire or tread member which is molded around or otherwise secured to an interior rim, which could be made of metal, and would form shoulder ring 48. As another alternative, rather than a journal bearing, any other suitable type of anti-friction bearing could be provided between the hub 31 and the wheel ring 30, such as a ball or sleeve type bearing. Thus, it should be understood that the invention could be applied to any stationary hub caster, regardless of the type of bearing between the hub and wheel ring, or the materials or particular structure of the hub and wheel ring.

Each hub half 32 and 34 has an axially facing hole 33, 35, respectively, which is located eccentrically from the axis of rotation of the wheel ring 30 relative to the hub 31 and through which the fastener 44 extends. The axis of rotation of the wheel ring 30 relative to the hub 31 passes through the axial center of the hub 31, which is the same as the axial center of the wheel ring 30, and is designated by reference numeral 27. The support axis, which is coaxial with holes 17, 41, 37, 33, 35, 39, 43 and 19, and fastener 44, is designated by reference numeral 29 in the drawings.

The elastomeric elements 36 and 38 are annular or donut shaped so that they have holes 37, 39, respectively, which are in registration with the holes 33 and 35 in the hub halves 32 and 34. The axially facing inner faces 54 and 56 of the respective torsion elements 36 and 38 are bonded by a suitable adhesive or otherwise fixedly secured to the adjacent hub half 32 and 34, respectively, so that they cannot move laterally relative to the respective hub half 32, 34. In other words, the face 54 cannot rotate relative to the hub half 32 about the support axis and the face 56 cannot rotate relative to the hub half 34. The adhesive bonding or other securement at these interfaces also preferably restrains the joined parts axially and radially.

The opposite axially facing face 58 and 60 of each respective element 36 and 38, which may be referred to as the axially exterior face, is bonded by a suitable adhesive or otherwise fixedly secured to the interior face of the adjacent torsion plate 40 or 42. Each torsion plate 40, 42 has a hole 41, 43, respectively, which is in registration with holes 37, 39 in the elements 36, 38, with holes 33, 35 in hub halves 32, 34 and with holes 17, 19 in arms 16, 18, respectively, all of which the fastener 44 passes through and are aligned along the support axis 29. Each hub half 32, 34 is preferably made of a rigid material, such as steel or a rigid plastic suitable for forming the bearing race at its exterior periphery, and that the torsion plates 40 and 42 are also preferably made of a structurally rigid material such as steel or strong plastic.

Each torsion plate 40 and 42 has a pair of pegs 62 on its exterior face which fit into holes 64 on the interior face of each of the arms 16 and 18 so as to prevent the torsion plates 40, 42 from rotating relative to their adjacent arms 16, 18. Thus, the exterior faces 58 and 60 of the elements 36 and 38 are each secured against rotation relative to their adjacent arms 16 and 18. However, the hub 31 may rotate back and forth somewhat relative to the arms 16 and 18, against the shear resistance provided by the elements 36 and 38.

It should be noted that the assembly of the torsion plates 40 and 42, elements 36 and 38, hub halves 32 and 34 and wheel ring 30 may be provided as a subassembly, and be snapped between the arms 16 and 18 until the pegs 62 engage into the holes 64. In some applications, this connection alone, without the fastener 44, may be sufficient to hold the wheel ring 30 between the arms 16 and 18. However, the fastener 44 and nut 46 provides additional support while still allowing limited back and forth rotation of the hub 31 relative to the arms 16 and 18 about support axis 29, and may be desired in some applications.

The embodiment 10' shown in FIGS. 4 and 5 is essentially the same as the embodiment of FIGS. 1 and 2, except that the arm 18 is removed from the body 12'. Thus, the assembly of the torsion plate 40, element 36, hub half 32, wheel ring 30, hub half 34, element 38 and torsion plate 42 is cantilevered from the single arm 16 by the fastener 44 and nut 46, with the nut 46 bearing directly on the torsion plate 42. All other elements are the same as in the embodiment 10 and are designated with the same reference numerals.

Preferred embodiments of the invention have been described in considerable detail. Many modifications and variations to the preferred embodiments will be apparent to those skilled in the art. For example, the elastomeric elements need not be coaxial with the support axis, but could be provided anywhere radially inside of the bearing where they would be loaded in shear between the supports and the hub. Therefore, the invention should not be limited to the embodiments described, but should be defined by the claims which follow.

We claim:

1. A shock and vibration isolating caster, comprising:
   a circular wheel ring adapted for rolling engagement with a ground or floor surface at its outer periphery;
   a hub radially inside of said wheel ring, said hub being secured to said wheel ring so as to restrain said wheel ring axially and radially relative to said hub;
   a bearing between said wheel ring and said hub so that said wheel ring can rotate relative to said hub about an axis of rotation which is coaxial with said hub, wheel ring and bearing; and
   a suspension for said hub, said suspension including:
   a body having a mount for mounting said caster to a structure to be supported at least in part by said caster and at least one support mounting said hub so as to allow limited angular motion of said hub relative to said support about a support axis which is offset from said axis of rotation of said wheel ring relative to said hub; and
   at least one elastomeric torsion element positioned radially inward of said bearing, said element having two axially facing, opposed faces, one of said faces being secured against lateral motion relative to said hub and the other of said faces being secured against lateral motion relative to said support, so that said hub can move angularly back and forth relative to said support about said support axis against resistance of said element.

2. A caster as claimed in claim 1, wherein said element is coaxial with said support axis.

3. A caster as claimed in claim 1, wherein a torsion plate is secured to said other face of said torsion element and said torsion plate is secured against lateral motion relative to said support.

4. A caster as claimed in claim 1, wherein two said torsion elements are provided, one of said elements being provided on each side of said hub.

5. A caster as claimed in claim 4, wherein two supports are provided on opposite sides of said hub, one of said supports being secured to one of said elements and the other of said supports being secured to the other of said elements.

6. A caster as claimed in claim 5, wherein a torsion plate is interposed between each torsion element and the corresponding support.

7. A caster as claimed in claim 1, wherein said hub is cantilevered from said support.

8. A caster as claimed in claim 7, wherein two torsion elements are provided, one on each side of said hub, and a fastener extends through both torsion elements and said hub.

9. A caster as claimed in claim 1, wherein two said supports are provided, one on each side of said hub, and two said torsion elements are provided, one on each side of said hub, each said element being secured to the hub and to a corresponding support.

10. A caster as claimed in claim 1, further comprising a fastener coaxial with said support axis, said fastener securing said support to said hub so as to allow said hub to rotate back and forth relative to said support about said support axis against the resistance of said torsion element.

* * * * *